United States Patent
Feng

(10) Patent No.: US 11,314,285 B2
(45) Date of Patent: Apr. 26, 2022

(54) FLEXIBLE DISPLAY DEVICE WITH STRETCHING MEMBERS AND TRANSMISSION MECHANISM

(71) Applicant: WUHAN CHINA STAR OPTOELECTRONICS SEMICONDUCTOR DISPLAY TECHNOLOGY CO., LTD., Hubei (CN)

(72) Inventor: Zikang Feng, Hubei (CN)

(73) Assignee: WUHAN CHINA STAR OPTOELECTRONICS SEMICONDUCTOR DISPLAY TECHNOLOGY CO., LTD., Wuhan (CN)

( * ) Notice: Subject to any disclaimer, the term of this patent is extended or adjusted under 35 U.S.C. 154(b) by 0 days.

(21) Appl. No.: 16/968,886

(22) PCT Filed: Jun. 19, 2020

(86) PCT No.: PCT/CN2020/097042
§ 371 (c)(1),
(2) Date: Aug. 11, 2020

(87) PCT Pub. No.: WO2021/237832
PCT Pub. Date: Dec. 2, 2021

(65) Prior Publication Data
US 2021/0373603 A1 Dec. 2, 2021

(30) Foreign Application Priority Data
May 26, 2020 (CN) .......................... 202010457002.9

(51) Int. Cl.
*G06F 1/16* (2006.01)
(52) U.S. Cl.
CPC .......... *G06F 1/1652* (2013.01); *G06F 1/1624* (2013.01)
(58) Field of Classification Search
CPC .. G06F 1/1652; G06F 1/1624; H04M 1/0268; G09F 9/301
See application file for complete search history.

(56) References Cited

U.S. PATENT DOCUMENTS

| | | | |
|---|---|---|---|
| 9,286,812 B2* | 3/2016 | Bohn | H04M 1/0268 |
| 10,209,742 B2* | 2/2019 | Shin | G06F 1/1624 |
| 11,016,532 B2* | 5/2021 | Yang | G06F 1/1616 |
| 2021/0181801 A1* | 6/2021 | Yin | H04M 1/0237 |

* cited by examiner

*Primary Examiner* — James Wu
(74) *Attorney, Agent, or Firm* — The Roy Gross Law Firm, LLC; Roy Gross

(57) ABSTRACT

A flexible display device is provided. A first support member is fixed to a housing, a second support member is slidably arranged relative to the first support member; a flexible display screen is disposed on a side of the first support member and the second support member, the first end is connected to an end of the second support member, and the second end is connected to the transmission mechanism in the housing; and when the first support member slides relative to the second support member, the transmission mechanism keeps movements of both ends of the flexible display screen in a same movement distance at a same time.

13 Claims, 4 Drawing Sheets

FLEXIBLE DISPLAY DEVICE WITH STRETCHING MEMBERS AND TRANSMISSION MECHANISM

FIELD OF INVENTION

The present disclosure relates to the field of display technologies, and more particularly, to a flexible display device.

BACKGROUND OF INVENTION

At present, flexible display devices have attracted wide attention because of their elasticity and flexibility. Compared with traditional screens, flexible screens possess the characteristics of strong flexibility and bendability. Their durability is much higher than other screens. The existing flexible screens include foldable and rollable display screens. Although the above two display screens reduce a certain extent of sizes of the panels, they still occupy large space.

Therefore, the existing flexible display device has a technical problem that the flexible display screen occupies a rather large space, which needs to be improved.

SUMMARY OF INVENTION

Technical Problem

Embodiments of the present disclosure provide a flexible display device to solve the technical problem that the flexible display screen occupies a rather large space in the existing flexible display device.

Technical Solution

In order to solve the above problems, the technical solutions provided by the present disclosure are as follows:

the present disclosure provides a flexible display device, comprising:

a housing, a first support member fixedly arranged with the housing, a second support member slidably arranged relatively to the first support member, and a transmission mechanism arranged in the housing and connected to the second support member; and a flexible display screen disposed on a side of the first support member and the second support member, wherein a first end of the flexible display screen is connected to an end of the second support member away from the first support member, and a second end of the flexible display screen is connected to the transmission mechanism;

wherein when the first support member slides relative to the second support member, the transmission mechanism keeps movements of both ends of the flexible display screen in a same movement distance at a same time.

In the flexible display device of the present disclosure, the transmission mechanism comprises a first stretching member, a second stretching member, a sliding member, and a transmission member, the first stretching member is fixed with the second support member, the second stretching member is fixed with the sliding member, the sliding member is slidably arranged relatively to the housing, the transmission member is connected to the housing, and the second end of the flexible display screen is connected to the sliding member.

In the flexible display device of the present disclosure, the first stretching member comprises a first gear rack fixed to a side of the second support member close to the sliding member, the second stretching member comprises a second gear rack fixed to a side of the sliding member close to the second support member, the transmission member comprises a gear and a gear shaft that passes through a central lock hole of the gear, the gear shaft is mounted on the housing, and the gear engages both the first gear rack and the second gear rack.

In the flexible display device of the present disclosure, both a module and a pitch of the first gear rack and the second gear rack are equal.

In the flexible display device of the present disclosure, the module of the gear is 0.25 mm to 5 mm.

In the flexible display device of the present disclosure, the housing comprises a first side plate and a second side plate arranged opposite each other, the first stretching member comprises two first gear racks that is individually close to the first side plate and the second side plate, the second stretching member comprises two second gear racks that is individually close to the first side plate and the second side plate, the transmission member comprises a first transmission member and a second transmission member that is respectively close to the first side plate and the second side plate, a gear shaft of the first transmission member is mounted on an inner wall of the first side plate, a gear shaft of the second transmission member is mounted on the inner wall of the second side plate.

In the flexible display device of the present disclosure, the housing comprises a first side plate and a second side plate arranged opposite each other, an entire surface of the first gear rack is disposed on a side of the sliding member close to the second support member, an entire surface of the second gear rack is disposed on a side of the sliding member close to the second support member, the gear shaft pass through both ends of the gear and is mounted on an inner wall of the first side plate and an inner wall of the second side plate.

In the flexible display device of the present disclosure, the housing comprises a bottom plate, a first side plate and a second side plates that are arranged opposite each other, a first chute, a second chute, and a transmission slot are formed on both an inner wall of the first side plate and an inner wall of the second side plate, the first chute and the second chute are parallel to the bottom plate, the transmission slot is formed between the first chute and the second chute, both sides of the second support member are movably mounted in the first chute, both sides of the sliding member are movably mounted in the second chute, and the gear shaft is movably mounted in the transmission slot.

In the flexible display device of the present disclosure, a locking slot is further formed on the inner wall of the first side plate and the inner wall of the second side plate, and both ends of the first support member are engaged in the locking slot.

In the flexible display device of the present disclosure, the second support member comprises first sliders arranged on both sides of the second support member, the first sliders are engaged in the first chute, the sliding member comprises second sliders arranged on both sides, and the second sliders are engaged in the second chute.

In the flexible display device of the present disclosure, the flexible display device further comprises a driving mechanism connected to the gear, the driving mechanism drives the gear to rotate in a first direction when the flexible display is in a first state, the driving mechanism drives the gear to rotate in the second direction when the flexible display screen is in a second state, the first direction is one of clockwise or counterclockwise, and the second direction is one of clockwise or counterclockwise other than the first direction.

In the flexible display device of the present disclosure, a plurality of grooves formed and being spaced a portion from each other on an upper surface of the first support member or an upper surface of the second support member, a plurality of comb teeth formed and being spaced a portion from each other on another upper surface of the first support member or the upper surface of the second support member, and the comb teeth are in one-to-one correspondence with the grooves and are engaged in the grooves.

In the flexible display device of the present disclosure, cross sections of the grooves are inverted trapezoids and cross sections of the comb teeth are regular trapezoids.

In the flexible display device of the present disclosure, a height of a top surface of the comb teeth is less than or equal to a height of a top opening of the groove.

In the flexible display device of the present disclosure, the flexible display device further comprises a guide member arranged within the housing, and the second end of the flexible display screen bypasses the guide member and is connected to the transmission mechanism.

In the flexible display device of the present disclosure, the guide member is a roller, and the housing comprises a first side plate and a second side plate disposed opposite each other, a circular protrusion is arranged on one of inner walls of the first side plate and the second side plate, or two end surfaces of the roller, a circular groove is arranged on another one of the inner walls of the first side plate and the second side plate, or the two end surfaces of the roller, and the circular protrusion is engaged in the circular groove.

In the flexible display device of the present disclosure, the first end of the flexible display screen is fixed to an end of the second support member away from the first support member via a first adhesive layer.

In the flexible display device of the present disclosure, the first adhesive layer is optical glue.

In the flexible display device of the present disclosure, the second end of the flexible display screen is connected to the transmission mechanism via a second adhesive layer or a clamping member.

In the flexible display device of the present disclosure, the second adhesive layer is optical glue.

Beneficial Effects

Beneficial effects of the present disclosure: A flexible display device is provided and includes a housing; a first support member fixedly arranged with the housing; a second support member slidably arranged relatively to the first support member; a transmission mechanism disposed on the housing and connected to the second support member; and a flexible display screen. The flexible display screen is disposed on a side of the first support member and the second support member. A first end of the flexible display screen is connected to an end of the second support member away from the first support member. A second end of the flexible display screen is connected to the transmission mechanism. When the first support member slides relative to the second support member, the transmission mechanism keeps movements of both ends of the flexible display screen in a same movement distance at a same time. By the above configuration, when a large screen display is needed in the flexible display device of the present disclosure, an area which will display images can be pulled out from the housing, so that the display area of the flexible display device is increased, and the displayed content can be abundant. When a small screen display is needed in the flexible display screen, the area which will not display images is retracted into the housing, so that the flexible display device has a smaller size, occupies less space, and is convenient to carry. When the flexible display is pulled out and retracted into the housing, movements of both ends are kept in a same movement distance at a same time. Thus, the flexible display is not be subjected to a large pulling force, and the service life of the flexible display screen is prolonged.

DESCRIPTION OF DRAWINGS

In order to illustrate technical solutions in the embodiments or in the prior art more clearly, the accompanying drawings required in the description of the embodiments or the prior art are introduced briefly hereafter. It is obvious that the accompanying drawings in the following description are merely portion of the embodiments of the present disclosure. People with ordinary skills in the art can obtain other drawings without making inventive efforts.

DETAILED DESCRIPTION OF PREFERRED EMBODIMENTS

In the following detailed description, reference is made to the accompanying figures, in which various examples are shown by way of illustration. In this regard, directional terminology mentioned in the present disclosure, such as "top", "bottom", "front", "back", "left", "right", "inner", "outer", "lateral", etc., is used with reference to the orientation of the figures being described. Therefore, the directional terminology is used for purposes of illustration and is not intended to limit the present invention. In the accompanying figures, units with similar structures are indicated by the same reference numbers.

Embodiments of the present disclosure provide a flexible display device to alleviate the technical problem that the flexible display screen occupies a large space in the existing flexible display device.

Figure 1:
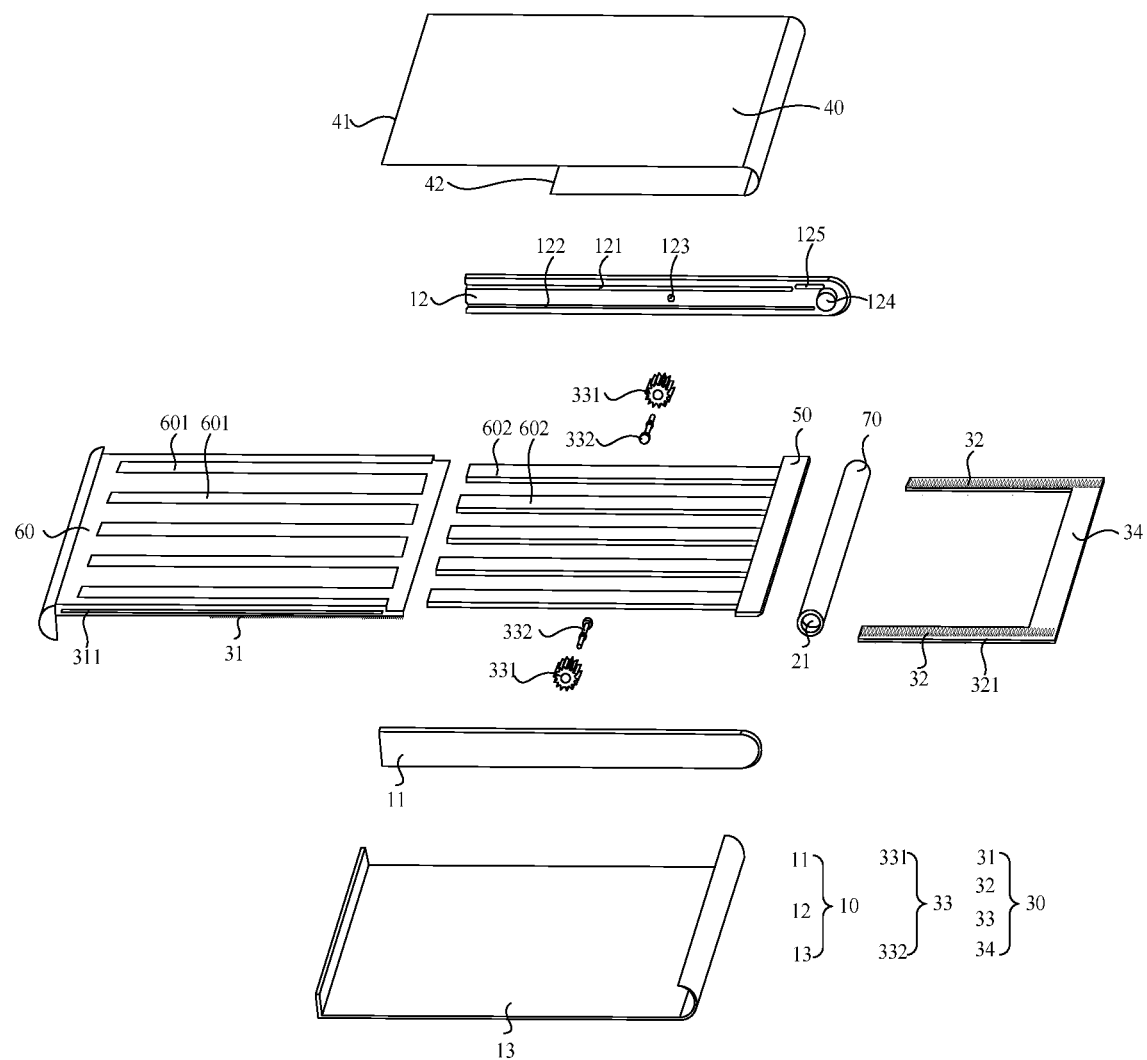
FIG. 1 is an exploded schematic view of a flexible display device provided by an embodiment of the present disclosure.
Figure 2:
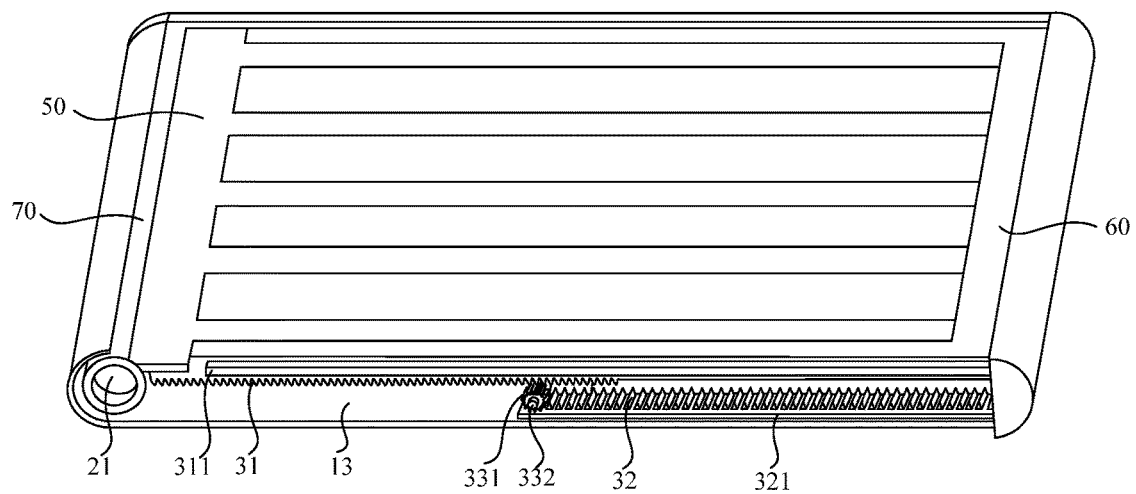
FIG. 2 is a schematic view of an assembly structure of a flexible display device provided by an embodiment of the present disclosure.

FIG. 1 is an exploded schematic view of a flexible display device provided by an embodiment of the present disclosure. FIG. 2 is a schematic view of an assembly structure of a flexible display device provided by an embodiment of the present disclosure. Referring to FIGS. 1 and 2, the flexible display device of the present disclosure includes the following:

a housing 10, a first support member 50 fixedly arranged with the housing 10, a second support member 60 slidably arranged relative to the first support member 50, and a transmission mechanism 30 arranged in the housing 10 and connected to the second support member 60; and a flexible display screen 40 disposed on a side of the first support member 50 and the second support member 60. A first end 41 of the flexible display screen 40 is connected to an end of the second support member 60 away from the first support member 50. A second end 42 of the flexible display screen 40 is connected to the transmission mechanism 30.

When the first support member 50 slides relatively to the second support member 60, both ends of the flexible display screen 40 maintain a movement that moves a same movement distance at a same time by the transmission mechanism 30.

The housing 10 includes a bottom plate 13, a first side plate 11, and a second side plate 12. The bottom plate 13 includes a rectangular bottom surface, a first bending part, and a second bending part. The first bending part and the second bending part are connected to both sides of the bottom surface that are opposite each other. The first bending part is a flat plate which is perpendicularly connected to one side of the bottom surface. The second bending part is connected to the other side of the bottom surface and is bent toward the first bending part to form a hollow semi-cylindrical shape. The first bending part and the second bending part are integrally formed with the bottom surface to form the bottom plate 13. The first side plate 11 and the second side plate 12 may be integrally formed with the bottom plate 13 or may be separately formed and then mounted on the bottom plate 13. The first side plate 11 and the second side plate 12 are both flat plates and are perpendicularly connected to the other two opposite sides of the bottom plate 13, so that the first side plate 11 and the second side plate 12 are parallel to each other. The bottom plate 13, the first side plate 11, and the second side plate 12 are connected to each other, so that a receiving chamber is defined inside the housing 10.

The first support member 50, the second support member 60, and the transmission mechanism 30 are all mounted inside the housing 10. The first support member 50 and the housing 10 are fixedly mounted. The second support member 60 and the transmission mechanism 30 are both movably mounted with the housing 10. The first support member 50 and the second support member 60 slidably arranged relative to each other. That is, the second support member 60 slides back and forth along a length direction of a side of the bottom plate 13 which intersects with the first side plate 11.

The transmission mechanism 30 is disposed in the housing 10 and is connected to the second support member 60. When the second support member 60 and the first support member 50 slide relative to each other, a part of members of the transmission mechanism 30 and the second support member 60 may gradually approach each other in a sliding direction at the same time, or may be gradually separated from each other in the sliding direction at the same time. The sliding direction is a length direction of the intersection of the bottom plate 13 and the first side plate 11, which refers to a horizontal direction of FIG. 1. Controlled by the transmission mechanism 30, movements of both ends of the flexible display screen 40 can be kept in a same movement distance at a same time. Directions of the movement of both ends are opposite each other.

The flexible display screen 40 is usually an OLED display screen, which has a foldable and rollable function. The flexible display screen 40 is disposed on a side of the first support member 50 and the second support member 60. The first end 41 is fixed on a side of the second support member 60 away from the first support member 50. The second end 42 is connected to the transmission mechanism 30. The first end 41 can be fixed to an upper surface of the second support member 60. The upper surface of the flexible display screen 40 can display images. The second end 42 is connected to the transmission mechanism 30. The second end 42 is not used for displaying images. Except for an area between the second end 42, the flexible display screen 40 can display images and the portion of the area can be located outside or inside the housing 10 according to an extent of stretching during a winding process.

According to different needs of users, the flexible display screen 40 may be in different states. The first state refers to a large-screen display state and the second state is a small-screen display state. In two states, the entirety of the first end 41 of the flexible display screen 40 is located on an outer surface of the flexible display device and can be used for displaying images.

Figure 4:
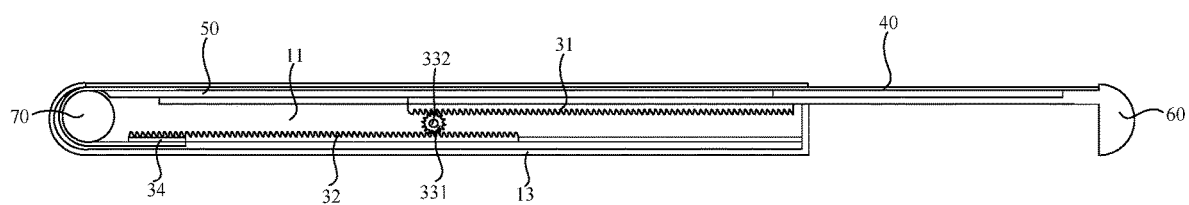
FIG. 4 is a schematic structural side view of the flexible display device provided by an embodiment of the present disclosure in a first state.
Figure 5:
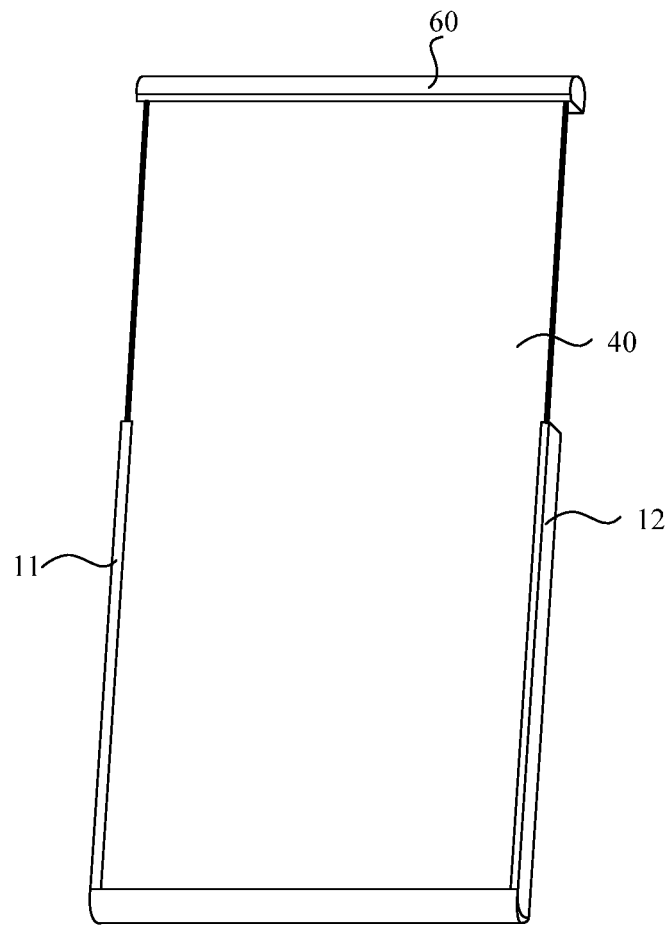
FIG. 5 is a schematic structural front view of a flexible display device provided by an embodiment of the present disclosure in the first state.

When the flexible display screen 40 is in the first state, as shown in FIGS. 4 and 5, the first support member 50 and the second support member 60 simultaneously slide away from each other. The first end 41 of the flexible display screen 40 slides together with the second support members 60. The second end 42 of the flexible display screen 40 slides together with the transmission mechanism 30. Both ends gradually move away from each other in the horizontal direction and maintain a movement that moves a same movement distance at a same time. A part of the flexible display screen 40 inside the housing 10 is gradually pulled out from the housing 10 by a joint action of the second support member 60 and the transmission mechanism 30. The area of the part of the flexible display screen 40 can be used for displaying images. After being pulled out from the housing 10, the first end 41 and a portion of area that is pulled out from the housing 10 display images together. When the stretchable areas of the flexible display screen 40 are all pulled out from the housing 10, the flexible display device can achieve large-screen display. A display area of the flexible display screen 40 is the maximum display area at this time.

Figure 6:
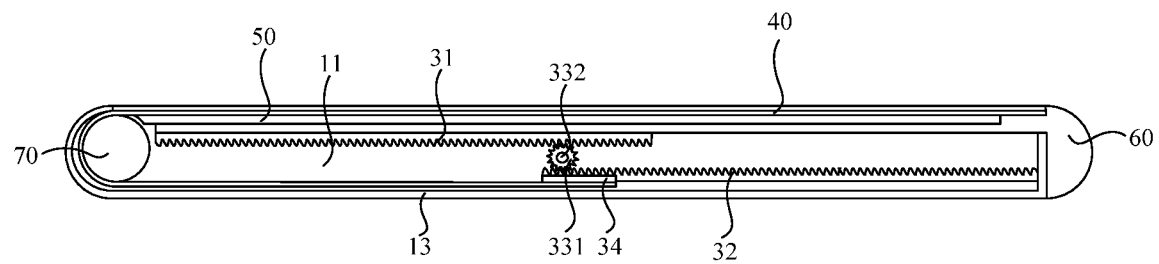
FIG. 6 is a schematic structural side view of the flexible display device provided by an embodiment of the present disclosure in a second state.
Figure 7:
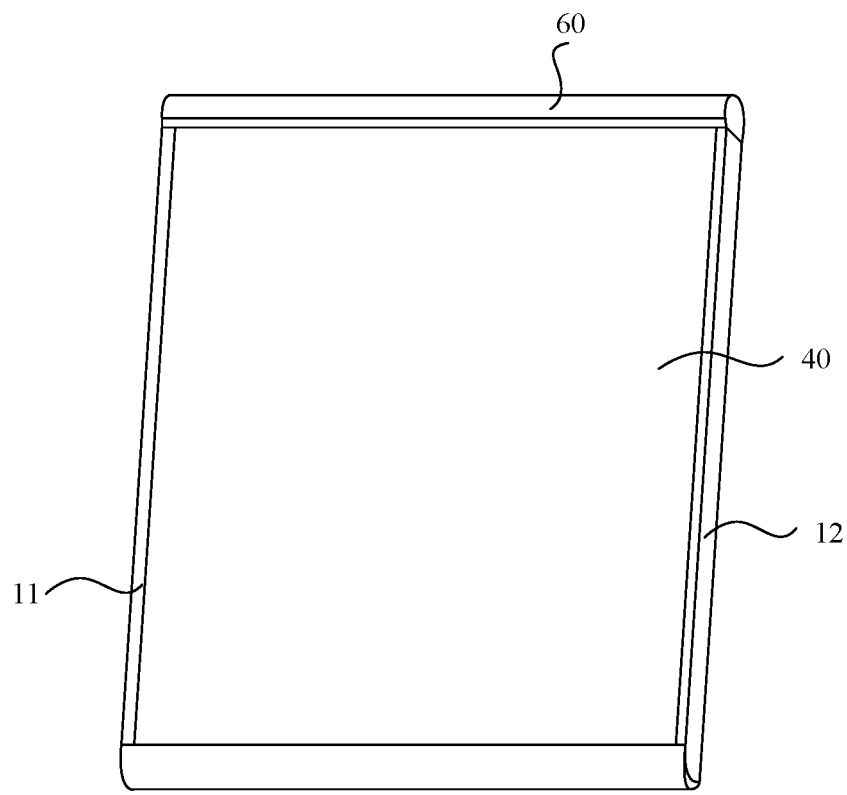
FIG. 7 is a schematic structural front view of a flexible display device provided by an embodiment of the present disclosure in the second state.

When the flexible display screen 40 is in the second state, as shown in FIGS. 6 and 7, the first support member 50 and the second support member 60 simultaneously slide toward each other. The first end 41 of the flexible display screen 40 slides together with the second support members 60. The second end 42 of the flexible display screen 40 slides together with the transmission mechanism 30. Both ends gradually approach each other in the horizontal direction and maintain a movement that moves a same movement distance at a same time. A part of the flexible display screen 40 outside the housing 10 is gradually retracted into the housing 10 by the joint action of the second support member 60 and the transmission mechanism 30. At this time, the first end 41 and the part that is not retracted into the housing 10 display images together. When the stretchable areas of the flexible display screen 40 are all pulled into the housing 10, the flexible display device can achieve small-screen display. A display area of the flexible display screen 40 is an initial display area.

By the above arrangement, the flexible display device can be switched between the first state and the second state. When a large screen display is needed in the flexible display screen 40, the area which will display images is pulled out from the housing 10 so that a display area of the flexible display device is increased, and the displayed content can be abundant. When a small screen display is needed in the flexible display screen 40, the area which will not display images is retracted into the housing 10, so that the flexible display device has a smaller size, occupies less space, and is convenient to carry. The flexible display device of the present disclosure can flexibly control the display area of the flexible display screen 40. The housing 10 can also protect the internal flexible display screen 40 from damages. In addition, during the process of retracting the flexible display screen 40 into the housing 10 and pulling out of the housing 10, both ends of the flexible display screen 40 maintain a movement that moves a same movement distance at a same time by the transmission mechanism 30. Therefore, at the same time, a length of the first end 41 of the flexible display screen 40 pulled out from the inside of the housing 10 is equal to a length of the part of the second end 42 extend to the outside of the housing 10. A speed of pulling outward and a speed of extending outward are equal, so that the flexible display screen 40 is not subjected to a large tension force when pulled outward and extending outward, thereby forming a protective effect on the flexible display screen 40 and prolonging service life of the flexible display screen 40.

In one embodiment, the transmission mechanism 30 includes a first stretching member 31, a second stretching member 32, a sliding member 34, and a transmission member 33. The first stretching member 31 is fixed to the second support member 60. The second stretching member 32 is fixed to the sliding member 34. The sliding member 34 is slidably disposed relative to the housing 10. The transmission member 33 is connected to the housing 10. A second end 42 of the flexible display screen 40 is connected to the sliding member 34.

The first stretching member 31 is located on a side of the second stretching member 32 away from the bottom plate 11. The transmission member 33 is located between the first stretching member 31 and the second stretching member 32. Both sides of the sliding member 34 are movably mounted on an inner wall of the first side plate 11 and an inner wall of the second side plate 12. Both the second support member 60 and the sliding member 34 are slidable back and forth in the sliding direction in the housing 10. When the transmission member 33 is in operation, the transmission member 33 can drive the first stretching member 31 and the second stretching member 32 to move in a sliding direction at the same time. According to the different states of the flexible display screen 40, the direction in which the transmission member 33 drives the first stretching member 31 and the second stretching member 32 to move is also different, so that both the first stretching member 31 and the second stretching member 32 can gradually approach each other in the sliding direction, and both the first stretching member 31 and the second stretching member 32 can also gradually move away from each other in the sliding direction.

When the flexible display screen 40 is in the first state, as shown in FIGS. 4 and 5, the transmission member 33 drives the first stretching member 31 and the second stretching member 32 to move away from each other. Because the second support member 60 is fixed with the first stretching member 31 and the sliding member 34 is fixed with the second stretching member 32, the first stretching member 31 drives the first end 41 of the flexible display screen 40 fixed on the second support member 60, and the second stretching member 32 drives the second end 42 of the flexible display screen fixed on the sliding member 34, thereby pulling at least a portion of an area of the flexible display screen 40 out of the housing 10.

When the flexible display screen 40 is in the second state, as shown in FIGS. 6 and 7, the transmission member 33 drives the first stretching member 31 and the second stretching member 32 to approach each other. The first stretching member 31 drives the first end 41 of the flexible display screen 40 fixed on the second support member 60, and the second stretching member 32 drives the second end 42 of the flexible display screen fixed on the sliding member 34, thereby retracting at least a portion of an area into the housing 10.

During a process of the flexible display screen 40 being pulled out or retracted into the housing 10, the transmission member 33 can control the first stretching member 31 and the second stretching member 32 to stop moving at any time, thereby controlling the flexible display device to choose any size of an area between the initial display area and the maximum display area for displaying images, so as to achieve desired flexibility.

The first support member 50 is fixed in the housing 10, so when the first stretching member 31 and the second stretching member 32 in the transmission mechanism 30 reversely move in the sliding direction at the same time, the first support member 50 remains stationary, the second support member 60 slides in a direction toward the first support member 50 or in a direction away from the first support member 50, thereby driving at least portion of the area of the flexible display screen 40 to be retracted into and pulled out of the housing 10. In order to maintain the second support 60 and the sliding member 34 to be consistent with the sliding direction during sliding, it is necessary to provide a limiting structure on the first side plate 11 and the second side plate 12.

Figure 3:
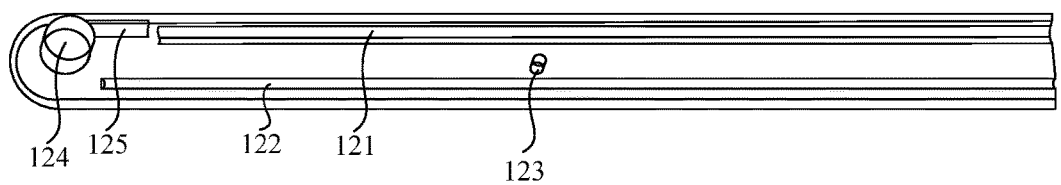
FIG. 3 is a schematic structural view of a second side plate of a flexible display device provided by an embodiment of the present disclosure.

As shown in FIGS. 1 and 3, the inner wall of the first side plate 11 and the inner wall of the second side plate 12 are provided with a first chute 121, a second chute 122, and a transmission slot 123. The first chute 121 and the second chutes 122 are parallel to the bottom plate 13. The transmission slot 123 is disposed between the first chute 121 and the second chute 122. Both sides of the second support member 60 are movably mounted in the first chute 121. Both sides of the sliding member 34 are movably mounted in the second chute 122. Both ends of the transmission member 33 are mounted in the transmission slot 123.

Specifically, the second support member 60 is a flat plate structure and is parallel to the bottom plate 13. The first end 41 of the flexible display screen 40 is fixed on an upper surface of the second support member 60, so the second support member 60 can serve a supporting function to the flexible display screen 40. First sliders 311 are disposed on both sides of the second support member 60. The first slider 311 are engaged in the first chute 121 and are slidable back and forth along a length of the first chute 121. The sliding member 34 is also a flat plate structure and is parallel to the bottom plate 13. The second end 42 of the flexible display screen 40 is fixed to an upper surface or a lower surface of the sliding member 34. Second sliders 321 are disposed on both sides of the sliding member 34. The second sliders 321 are movably engaged in the second chute 122 and are slidable back and forth along a length of the second chute 122.

During the sliding process, because the second support member 60 and the sliding member 34 both slide along a length direction of the first chute 121 and the second chute 122, it can be ensured that the flexible display screen 40 outside the housing 10 also be retracted into and pull out of the housing 10 in that direction. When an image on the flexible display screen 40 is being watched, the inclining or uneven conditions does not occur to the screen, which ensures a viewing effect.

As shown in FIGS. 1 and 2, the second support member 60 is disposed opposite the sliding member 34. The first stretching member 31 includes a first gear rack fixed on a side of the second support member 60 close to the sliding member 34. The second stretching member 32 includes a second gear rack fixed on a side of the sliding member 34 close to the second support member 60. The transmission member 33 includes a gear 331 and a gear shaft 332 locked through a central lock hole of the gear 331. The gear shaft 332 is mounted on the housing 10. The gear 331 engages both the first gear rack and the second gear rack.

The gear shaft 332 is movably mounted in the transmission slot 123, thereby rotating the gear 331 clockwise or counterclockwise around its own axis. The gear 331 engages the first gear rack and the second gear rack. Both a pitch and a module of the gear 331, the first gear rack, and the second module and the rack are equal. Therefore, the first gear rack cooperates with the gear 331 to form a gear pair. The second gear rack and the gear 331 also form a gear pair.

As shown in FIGS. 4 and 6, when the flexible display device switches between the first state and the second state, the rotation of the gear 331 drives the first stretching member 31 and the second stretching member 32 to move. A power of the gear 331 is from a driving mechanism (not shown) of the flexible display device. When the flexible display screen 40 is in the first state, the driving mechanism drives the gear 331 to rotate in a first direction. By engaging the first gear rack, the gear 331 drives the first stretching member 31 to move away from the second stretching member 32. By engaging the second gear rack, the gear 331 drives the first stretching member 31 to move away from the first stretching member 32. When the flexible display screen 40 is in the second state, the driving mechanism drives the gear 331 to rotate in the second direction. By engaging the first gear rack, the gear 331 drives the first stretching member 31 to move in a direction toward the second stretching member 32. By engaging the second gear rack, the gear 331 drives the second stretching member 32 moves in a direction closer to the first stretching member 31. The first direction is one of a clockwise direction or a counterclockwise direction. The second direction is another one of the clockwise direction or the counterclockwise direction.

The driving mechanism may be a motor or a deceleration device connected to the gear 331. A motor or a deceleration device is used to drive the gear 331 so that the entire motion system can be controlled by an electrical signal. A user only needs to transmit an electrical signal to the motor through a button to drive the movement of the entire motion system. Therefore, the flexible display device of the present disclosure is switchable between the retracting and the stretching display states.

Because the gear 331 engages both the first gear rack and the second gear rack, the moving distance of the second support member 60 and the sliding member 34 remains the same length and in an opposite direction from beginning to end. That is, when the flexible display screen 40 is pulled out from the housing 10, a length of a part of the second support member 60 retracted from the inside of the housing 10 is equal to a length of a part of the sliding member 34 extended to the outside of the housing 10. A speed of pulling outward and a speed of extending outward are equal, so that the flexible display screen 40 is not subjected to a large tension force when pulled outward and extending outward, thereby forming a protective effect on the flexible display screen 40 and prolonging service life of the flexible display screen 40.

The gear 331 is movably mounted in the transmission slot 123 by the gear shaft 332 and drives the first stretching member 31 and the second stretching member 32 to move reversely by rotation of the gear 331. In order to possibly increase a distance that the first stretching member 31 and the second stretching member 32 can move, the transmission slot 123 is provided at an intermediate position on the inner wall of the first side plate 11 and the inner wall of the second side plate 12. That is, the gear 331 is located in a middle position of the flexible display device.

In one embodiment, a module of the gear 331 is 0.25 mm to 5 mm.

The first gear rack is disposed on a side of the second support member 60 close to the sliding member 34. The second gear rack is disposed on a side of the sliding member 34 close to the second support member 60. Movement of the rack is driven by the rotation of the gear 331 of the transmission member 33. There are many ways to arrange the first gear rack, the second gear rack, and the transmission member 33.

In one embodiment, an entire surface of the first gear rack is located on the side of the second support member 60 close to the sliding member 34. An entire surface of the second gear rack is located on the side of the sliding member 34 close to the second support member 60. The gear shaft 332 penetrates both ends of the gear 331 and is movably mounted with the transmission slots 123 on the first side plate 11 and the second side plate 12. A width of the gear 331 is less than or equal to a spacing between the first side plate 11 and the second side plate 12.

In one embodiment, as shown in FIG. 1, the first stretching member 31 includes two first gear racks that are close to the first side plate 11 and the second side plate 12. The second stretching member 32 includes two second gear racks that are close to the first side plate 11 and the second side plate 12. The transmission member 33 includes a first transmission member and a second transmission member. The gear 331 of the first transmission member engages the first gear and the second gear that are close to the first side plate 11. The gear shaft 332 is mounted on the inner wall of the first side plate 11. The gear 331 of the second transmission member engages the first gear rack and the second gear rack that are close to the second side plate 12. The gear shaft 332 is mounted on the inner wall of the second side plate 12.

Specifically, a bottom surface of the second support member 60 is provided with two first gear racks that is parallel to each other. The two first gear racks are close to the first side plate 11 and the second side plate 12. The two first gear racks are identical. A top surface of the sliding member 34 is provided with two second gear racks that is parallel to each other. The two second gear racks are close to the first side plate 11 and the second side plate 12, and corresponding to the two first gear racks. The two second gear racks are also identical. The transmission member 33 includes a first transmission member and a second transmission member that are separated from each other. The gear shaft 332 of the first transmission member is movably mounted in the transmission slot 123 on the first side plate 11. The gear shaft 332 of the second transmission member is movably mounted in the transmission slot 123 on the second side plate 12. The gear 331 of the first transmission member engages both the first gear rack and the second gear rack close to the first side plate 11. The gear 331 of the second transmission member engages both the first gear rack and the second gear rack close to the second side plate 12. The two gears 331 of the two transmission members are identical and the two gear shafts 332 are also identical.

In the flexible display device of the present disclosure, by the cooperation of the gear 331, the gear shaft 332, the first gear rack, and the second gear rack, the flexible display 40 can be switched between the first state and the second state. And the flexible display screen 40 is not subjected to a large tension force when pulled outward and extending outward from the housing 10. The entire transmission mechanism 30 has a simple structure and does not require too much complicated design. Therefore, interior of the flexible display device occupies a smaller size, which further make the flexible display device to have a smaller overall size and be conveniently carried.

Because the second support member 60 and the sliding member 34 are both flat panel structures, in order to prevent the flexible display 40 from being scratched when the flexible display 40 is fixed with the second support member 60 and the sliding member 34 and is perpendicular to edges of the second support member 60 and the sliding member 34, a guide member 70 is provided on a side of the second support member 60 and the flexible display screen 40 bypasses the guide member 70, so that the first end 41 and the second end 42 of the flexible display screen 40 can be switched smoothly.

Both ends of the guide member 70 are mounted on the first side plate 11 and the second side plate 12. The guide member 70 is used for providing direction guidance during the sliding process of the flexible display screen 40, so that the flexible display screen 40 slides smoothly. The guide member 70 can be fixedly mounted or movably mounted on the first side plate 11 and the second side plate 12. In the present embodiment, a mounting means of the guide member 70 is movably mounted.

In one embodiment, the guide member 70 is a roller. Two end surfaces of the roller are movably mounted on the first side plate 11 and the second side plate 12. Specifically, a circular protrusion 124 is arranged on one of inner walls of the first side plate 11 and the second side plate 12, or two end surfaces of the roller, a circular groove 124 is arranged on another one of the inner walls of the first side plate 11 and the second side plate 12, or the two end surfaces of the roller, and the circular protrusion 124 is engaged in the circular groove 21. That is, as shown in FIGS. 1 and 3, the circular protrusions 124 may be provided on the inner walls of the first side plate 11 and the second side plate 12. circular grooves 21 may be provided on both end surfaces of the roller. Then, the two circular protrusions 124 are engaged in the two circular grooves 21. The circular grooves 21 may be provided on the inner wall of the first side plate 11 and the inner wall of the second side plate 12. Circular protrusions 124 is provided on both end surfaces of the roller. Then, the two circular protrusions 124 are also engaged into the two circular grooves 21 by either one way. The center of the circular protrusion 124 and the circular groove 21 both fall on an axis of the roller, so the roller can rotate around its own axis. When the flexible display screen 40 is pulled out and retracted into the housing 10, the roller can rotate along a moving direction of the flexible display screen 40, so that a resistance is reduced and easier to be pulled when the flexible display screen 40 is stretched. The bottom surface of the flexible display screen 40 may not produce a large friction, thereby prolonging service life.

As shown in FIGS. 1 and 2, both sides of the first support member 50 are fixedly mounted on the inner wall of the first side plate 11 and the inner wall of the second side plate 12, the second end 42 of the flexible display screen 40 is connected to the sliding member 34. The inner wall of the first side plate 11 and the inner wall of the second side plate 12 are each formed with a locking slot 125. Both ends of the first support member 50 are engaged in the locking slot 125. The first support member 50 and the first side plate 11 and the second side plates 12 is not movable or rotatable relative to each other.

The first end 41 of the flexible display screen 40 is fixed to an upper surface of the second support member 60. A second end 42 is fixed to the sliding member 34. When the flexible display screen 40 is gradually pulled out from the housing 10, a part of the flexible display screen 40 outside the housing 10 moves with the second support member 60, and the other part of the flexible display screen 40 is supported by the first support member 50. In order to ensure that the part of the flexible display screen 40 outside the housing 10 can be supported during the pulling process, the first support member 50 and the second support member 60 are arranged to have overlapping parts by the present disclosure. That is, the first support member 50 and the second support member 60 may not present a state of separating from each other during stretching.

In an embodiment, as shown in FIGS. 1 and 2, in the first support member 50 and the second support member 60, an upper surface of one of the first support member 50 and the second support member 60 is provided with a plurality of grooves 601 that are spaced from each other. A length direction is the grooves 601 as the is the same as the sliding direction. Another one of the first support member 50 and the second support member 60 includes a plurality of comb teeth 602 that are spaced from each other. The comb teeth 602 are in one-to-one correspondence with the grooves 601 one-to-one and are engaged in the grooves 601.

In the present embodiment, a second support member 60 having a groove 601 and a first support member 50 having a comb tooth 602 are used as an example. A length direction of the groove 601 is the same as the sliding direction. The comb teeth 602 are in one-to-one correspondence with the groove 601 and are engaged in the groove 601 along a length direction of the groove 601. When the flexible display screen 40 is pulled out from the housing 10 along with movement of the first stretching member 31, the first support member 50 remains stationary, because the first support member 50 is fixed to the first side plate 11 and the second side plate 12. The comb teeth 602 gradually slide away from the groove 601 along with the movement of the first stretching member 31. A length of the comb teeth 602 engaged in the groove 601 gradually becomes shorter. When the flexible display screen 40 is retracted into the housing 10 along with the movement of the first stretching member 31, the comb teeth 602 gradually slide toward the groove 601 along with the movement of the first stretching member 31. The length of the comb teeth 602 engaged in the groove 601 gradually becomes longer.

In an embodiment, the length of the comb teeth 602 is less than or equal to a length of the groove 601, so that when a display area of the first stretching member 31 moved to the flexible display screen 40 is an initial display area, the comb teeth 602 are completely engaged in the groove 601 in a length direction. Meanwhile, the first support member 50 and the second support member 60 cooperate with each other. There is no large gap between the first support member 50 and the second support member 60. When the flexible display screen 40 is being touched, all parts are supported, thereby enhancing touch effect. In addition, the length direction of the groove 601 can provide a limit of the sliding direction, so that the flexible display screen 40 is evenly stressed during stretching process.

Figure 8:
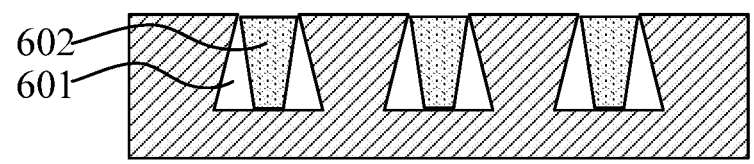
FIG. 8 is a schematic cross-sectional view of a groove and a supporting comb of a flexible display device provided by an embodiment of the present disclosure.

In one embodiment, as shown in FIG. 8, cross sections of the grooves 601 are inverted trapezoids. The cross section of the comb teeth 602 are regular trapezoids. A height of the top surface of the comb teeth 602 is less than or equal to a height of a top opening of the groove 601. The cross sections of the grooves 601 are inverted trapezoids, i.e., the groove 601 is a dovetail groove. An area of a bottom surface of the groove 601 is larger than an area of the top opening and the top surface of the comb teeth 602 is located below or flushes with the opening of the groove 601. Therefore, when the comb teeth 602 are engaged in the groove 601, the top opening of the groove 601 can provide a limit of an up-and-down direction, so that the entire comb teeth 602 cannot pass through the opening of the groove 601, thereby preventing the comb teeth 602 of the first support member 50 form tilting upward to scratch the flexible display screen 40.

In an embodiment, if the grooves 601 are equally spaced from each other, the comb teeth 602 also correspondingly equally spaced from each other. Both the grooves 601 and the comb teeth 602 provide more uniform support to the flexible display screen 40, which has a better support effect.

It is noted that both structures and shapes of the first support member 50 and the second support member 60 in the present disclosure are not limited thereto, Other first support member 50 and second support member 60 that can provide a support function to the flexible display screen after at least portion of the area of the flexible display screen 40 is pulled out from the housing 10 are all fall within the protection scope of the present disclosure.

In one embodiment, as shown in FIGS. 1 and 2, the end of the second support member 60 away from the first support member 50 is provided with a fixing part facing towards the bottom plate 13. The fixing part forms a solid semi-cylindrical shape, including a semi-cylindrical shape, a flat surface, and two oppositely disposed end surfaces. When the display area of the flexible display screen 40 is equal to the initial display area, a flat surface of the fixing part is in contact with an outer wall of the third side plate of the housing 10 to block external impurities and dust from entering the inside of the housing 10 and damaging the flexible display screen 40.

A first end 41 of the flexible display screen 40 is fixed on an upper surface of the second support member 60 by a first adhesive layer. A material of the first adhesive layer may be an optical glue. A second end 42 of the flexible display screen is fixed to an upper surface or a lower surface of the sliding member 34 by a second adhesive layer or a clamping member. Material of the second adhesive layer may be an optical glue. The clamping member may be a splint or the like.

It is appreciated from the above embodiments that the flexible display device provided by the present disclosure can be provided with a transmission mechanism to increase or decrease the size of the flexible display device in the sliding direction. During the stretching process, by the cooperation of members such as the gear and the rack, the flexible display screen that is originally contained in the housing can be pulled out from an upper surface of the flexible display device to increase a display size of the flexible display device. It can also be stretched in an opposite direction to accommodate a part of the upper surface of the flexible display screen of the flexible display device inside the housing until it is reduced to the original size. By the above arrangement, the flexible display device can be switched between the first state and the second state. The flexible display screen 40 is not greatly pulled during a process of pulling out and retracting into the housing 10. When a large screen display is needed in the flexible display screen, the area which will display images is pulled out from the housing 10 so that a display area of the flexible display device is increased, and the displayed content can be abundant. When a small screen display is needed in the flexible display screen 40 pulled a small-screen display, the area is retracted into the housing 10, so that the flexible display device has a smaller size, occupies less space, and is convenient to carry.

According to the above embodiments, a flexible display device is provided and includes a housing, a first support member fixedly arranged with the housing, and a second support member slidably arranged with the first support member, a transmission mechanism provided in the housing and connected to the second support member, and a flexible display screen. The flexible display screen is disposed on a side of the first support member and the second support member. A first end of the flexible display screen is connected to the second support member away from an end the first support member. A second end of the flexible display screen is connected to the transmission mechanism. When the first support member and the second support member slide relative to each other, both ends of the display screen maintain a movement that moves a same movement distance at a same time by the transmission mechanism. By the above arrangement, when a large screen display is needed in the flexible display screen, the area which will display images is pulled out from the housing 10 so that a display area of the flexible display device is increased and the displayed content can be abundant. When a small screen display is needed in the flexible display screen, the area which will not display images is retracted into the housing, so that the flexible display device has a smaller size, occupies less space, and is convenient to carry. In the pulling process and the retracting process of the flexible display screen, both ends maintain a movement that maintain a movement that moves a same movement distance at a same time, so they will not be subjected to a large tension force, and the service life of the flexible display screen is prolonged.

In the above embodiments, the description of each embodiment has its own emphasis. For a portion that is not described in detail in a certain embodiment, references are made to related descriptions of other embodiments.

The flexible display device provided by the embodiments of the present disclosure has been described in detail hereabove. The present disclosure uses specific examples to explain the principles and implementation of the present disclosure. The descriptions of the foregoing embodiments are merely for understanding the technical solutions and principle ideas of the present disclosure. People skilled in the art should understand that modifications may be made to the technical solutions described in the foregoing embodiments, or equivalently replace some of the technical features thereof. The modifications or replacements do not make principle of the corresponding technical solutions depart from the scope of the technical solutions of the embodiments of the present disclosure.

The invention claimed is:
1. A flexible display device, comprising:
a housing, a first support member fixedly arranged with the housing, a second support member slidably arranged relatively to the first support member, and a transmission mechanism arranged in the housing and connected to the second support member; and a flexible display screen disposed on a side of the first support member and the second support member, wherein a first end of the flexible display screen is connected to an end of the second support member away from the first support member, and a second end of the flexible display screen is connected to the transmission mechanism;

wherein when the first support member slides relative to the second support member, the transmission mechanism keeps movements of both ends of the flexible display screen in a same movement distance at a same time, wherein the transmission mechanism comprises a first stretching member, a second stretching member, a sliding member, and a transmission member, the first stretching member is fixed with the second support member, the second stretching member is fixed with the sliding member, the sliding member is slidably arranged relatively to the housing, the transmission member is connected to the housing, and the second end of the flexible display screen is connected to the sliding member, wherein the first stretching member comprises a first gear rack fixed to a side of the second support member close to the sliding member, the second stretching member comprises a second gear rack fixed to a side of the sliding member close to the second support member, the transmission member comprises a gear and a gear shaft that passes through a central lock hole of the gear, the gear shaft is mounted on the housing, and the gear engages both the first gear rack and the second gear rack.

2. The flexible display device according to claim 1, wherein both a module and a pitch of the first gear rack and the second gear rack are equal.

3. The flexible display device according to claim 1, wherein the module of the gear is 0.25 mm to 5 mm.

4. The flexible display device according to claim 1, wherein the housing comprises a first side plate and a second side plate arranged opposite each other, the first stretching member comprises two first gear racks that is individually close to the first side plate and the second side plate, the second stretching member comprises two second gear racks that is individually close to the first side plate and the second side plate, the transmission member comprises a first transmission member and a second transmission member, a gear of the first transmission member engages the first gear rack and the second gear rack that are adjacent to the first side plate, a gear shaft of the first transmission member is mounted on an inner wall of the first side plate, a gear of the second transmission member engages the first gear rack and the second gear rack that are adjacent to the second side plate, and a gear shaft of the second transmission member is mounted on the inner wall of the second side plate.

5. The flexible display device according to claim 1, wherein the housing comprises a first side plate and a second side plate arranged opposite each other, an entire surface of the first gear rack is disposed on a side of the sliding member close to the second support member, an entire surface of the second gear rack is disposed on a side of the sliding member close to the second support member, the gear shaft pass through both ends of the gear and is mounted on an inner wall of the first side plate and an inner wall of the second side plate.

6. The flexible display device according to claim 1, wherein the housing comprises a bottom plate, a first side plate and a second side plates that are arranged opposite each other, a first chute, a second chute, and a transmission slot are formed on both an inner wall of the first side plate and an inner wall of the second side plate, the first chute and the second chute are parallel to the bottom plate, the transmission slot is formed between the first chute and the second chute, both sides of the second support member are movably mounted in the first chute, both sides of the sliding member are movably mounted in the second chute, and the gear shaft is movably mounted in the transmission slot.

7. The flexible display device according to claim 6, wherein a locking slot is further formed on the inner wall of the first side plate and the inner wall of the second side plate, and both ends of the first support member are engaged in the locking slot.

8. The flexible display device according to claim 6, wherein the second support member comprises first sliders arranged on both sides of the second support member, the first sliders are engaged in the first chute, the sliding member comprises second sliders arranged on both sides, and the second sliders are engaged in the second chute.

9. The flexible display device according to claim 1, wherein a plurality of grooves formed and being spaced a portion from each other on an upper surface of the first support member or an upper surface of the second support member, a plurality of comb teeth formed and being spaced a portion from each other on another upper surface of the first support member or the upper surface of the second support member, and the comb teeth are in one-to-one correspondence with the grooves and are engaged in the grooves.

10. The flexible display device according to claim 9, wherein cross sections of the grooves are inverted trapezoids and cross sections of the comb teeth are regular trapezoids.

11. The flexible display device according to claim 10, wherein a height of a top surface of the comb teeth is less than or equal to a height of a top opening of the groove.

12. The flexible display device according to claim 1, wherein the flexible display device further comprises a guide member arranged within the housing, and the second end of the flexible display screen bypasses the guide member and is connected to the transmission mechanism.

13. The flexible display device according to claim 12, wherein the guide member is a roller, and the housing comprises a first side plate and a second side plate disposed opposite each other, a circular protrusion is arranged on one of inner walls of the first side plate and the second side plate, or two end surfaces of the roller, a circular groove is arranged on another one of the inner walls of the first side plate and the second side plate, or the two end surfaces of the roller, and the circular protrusion is engaged in the circular groove.

* * * * *